United States Patent [19]

Satake et al.

[11] Patent Number: 5,378,771
[45] Date of Patent: * Jan. 3, 1995

[54] HIGH-HEAT-RESISTANT, CRYSTALLINE BLOCK COPOLYMERS AND PRODUCTION PROCESS THEREOF

[75] Inventors: Yoshikatsu Satake; Yoshiyuki Inaguma, both of Iwaki; Shinji Yamamoto, Tokyo, all of Japan

[73] Assignee: Kureha Kagaku Kogyo K.K., Tokyo, Japan

[ * ] Notice: The portion of the term of this patent subsequent to Sep. 28, 2010 has been disclaimed.

[21] Appl. No.: 40,066

[22] Filed: Mar. 30, 1993

Related U.S. Application Data

[62] Division of Ser. No. 633,892, Dec. 26, 1990, Pat. No. 5,248,743.

[30] Foreign Application Priority Data

Dec. 29, 1989 [JP] Japan ................................. 1-342968
Nov. 27, 1990 [JP] Japan ................................. 2-320810

[51] Int. Cl.$^6$ .............................................. C08G 2/00
[52] U.S. Cl. ........................ 525/471; 525/537; 528/226
[58] Field of Search ................ 525/471, 537; 528/226

[56] References Cited

U.S. PATENT DOCUMENTS

| | | | |
|---|---|---|---|
| 3,442,857 | 5/1969 | Thornton . | |
| 4,772,679 | 9/1988 | Fukawa et al. | 528/128 |
| 4,795,799 | 4/1989 | Cleary . | |
| 4,960,555 | 10/1990 | Satake et al. | 525/537 |

FOREIGN PATENT DOCUMENTS

| | | |
|---|---|---|
| 185317 | 6/1986 | European Pat. Off. . |
| 210377 | 2/1987 | European Pat. Off. . |
| 296877 | 12/1988 | European Pat. Off. . |
| 369620 | 5/1990 | European Pat. Off. . |
| 3405523A1 | 2/1984 | Germany . |
| 52-12240 | 1/1977 | Japan . |
| 60-120720 | 6/1985 | Japan . |
| 62-27434 | 2/1987 | Japan . |

*Primary Examiner*—Melvyn I. Marquis
*Assistant Examiner*—Helen F. Lee
*Attorney, Agent, or Firm*—Lowe, Price, LeBlanc & Becker

[57] ABSTRACT

Disclosed herein are a poly(arylene thioether) block copolymer alternately comprising (A) at least one poly(arylene thioetherketoneketone) block having predominant recurring units of the formula

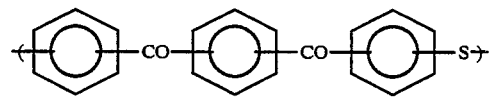

and (B) at least one poly(arylene thioether) block having predominant recurring units of the formula

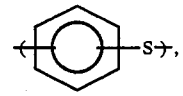

(a) the ratio of the total amount of the poly(arylene thioether) block (B) to the total amount of the poly(arylene thioetherketoneketone) block (A) being within a range of 0.1–9 by weight, (B) the weight average molecular weight of the poly(arylene thioether) block (B) being at least 1,000, and (c) said block copolymer having a melt viscosity of 2–100,000 poises as measured at 380° C. and a shear rate of 1,200/sec as well as a production process of the block copolymer.

7 Claims, No Drawings

HIGH-HEAT-RESISTANT, CRYSTALLINE BLOCK COPOLYMERS AND PRODUCTION PROCESS THEREOF

This application is a division of application Ser. No. 07/633,892 filed Dec. 26, 1990, now U.S. Pat. No. 5,248,743.

FIELD OF THE INVENTION

This invention relates to high-heat-resistant block copolymers having excellent melt stability, processability, handling properties, solvent resistance and moisture absorption resistance, and more specifically to novel high-heat-resistant, crystalline block copolymers containing at least one poly(arylene thioetherketoneketone) block having predominant recurring units of the formula

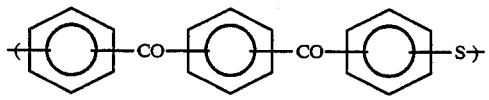

and at least one poly(arylene thioether) block having predominant recurring units of the formula

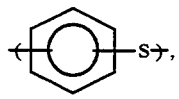

and also to a process for the production thereof.

This invention is also concerned with a process for economically producing the block copolymers.

BACKGROUND OF THE INVENTION

In the fields of the electronic and electrical industry and the automobile, aircraft and space industries, there is a strong demand in recent years for crystalline, thermoplastic resins having high heat resistance of about 300° C. or higher in terms of melting point and moreover easy melt processability.

Recently, poly(arylene thioetherketoneketones) (hereinafter abbreviated as "PTKKs") have drawn attention for their high melting points. Various studies are now under way thereon.

There are some disclosure on PTKKs, for example, in U.S. Pat. No. 3,442,857, German Offenlegungsschrift 3405523 A1, Japanese Patent Laid-Open No. 27434/1987, U.S. Pat. No. 104,795,799, Japanese Patent Laid-Open No. 120720/1985, etc.

Regarding the PTKKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKKs by conventional melt processing techniques is believed to be attributed to the extremely high melting points of the conventional PTKKs, which was about 410° C., so that a high melt processing temperature was needed. They therefore tended to lose crystallinity or to undergo crosslinking and/or carbonization, resulting in a rapid increase in melt viscosity, upon their melt processing.

PTKKs contain two ketone groups in each recurring unit and are hence inferior in solvent resistance and moisture absorption resistance. A limitation is therefore unavoidably posed on their application fields as heat-resistant resins. Moreover, these PTKKs are generally obtained as fine powders. This has led to an additional problem upon their production such that they show poor handling properties in their collection step after polymerization, especially in filtration, washing, drying and transportation. Still further problems have also arisen such as poor metering property upon melt processing and occurrence of blocking in hoppers or the like.

On the other hand, as poly(arylene thioethers) (hereinafter abbreviated as "PATEs"), for example, poly(p-phenylene thioether) has found utility as a high-performance engineering plastic having heat resistance and solvent resistance. It can be obtained by reacting dichlorobenzene and sodium sulfide, which are both very inexpensive monomers readily available on an industrial scale (Japanese Patent Publication No. 12240/1977). However, the melting point of its crystals is below 300° C. and its glass transition temperature (Tg) is as low as about 90° C. There is hence an outstanding desire for the development of polymers having high melting point and high Tg.

OBJECTS AND SUMMARY OF THE INVENTION

An object of this invention is to provide block copolymers with improved processability, handling properties, solvent resistance, moisture absorption resistance and the like, while retaining the inherent excellent properties of PTKKs, such as heat resistance and crystallinity, as much as possible.

Another object of the present invention is to provide a process for economically producing the block copolymers.

With a view toward improving the processability of a PTKK, the present inventors first of all attempted to lower its melting point, i.e., its processing temperature by random copolymerization of its monomer with monomers of a kind different from the first-mentioned monomer. Namely, bis(4-chlorobenzoyl)benzene was combined with dihalobenzenes, respectively, followed by random copolymerization. However, the resultant random copolymers tended to have lower crystallinity and heat resistance and to show poorer heat stability in a molten state as the proportions of the dihalobenzenes increased.

Further, bis(halobenzoyl)benzenes have been activated by the ketone group and have far higher reactivity compared to dihalobenzenes. They hence have extremely poor copolymerizability with dihalobenzenes.

The present inventors then attempted to produce a PTKK-PATE block copolymer in which a PATE having recurring units of the formula

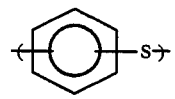

is incorporated as blocks in the chain of a PTKK.

As a result, it has been found that a block copolymer having excellent processability and high crystallinity can be obtained by using as a prepolymer a PATE, which has a particular average molecular weight and contains terminal thiolate groups and/or thiol groups as reactive terminal groups, and reacting the PATE prepolymer with a bis(halobenzoyl)benzene and an alkali metal sulfide under specific conditions in an organic amide solvent.

It has also been found that a similar block copolymer can be obtained by reacting a PATE prepolymer with a PTKK prepolymer under specific conditions.

It has also been uncovered that these block copolymers can each be obtained as granules having good handling properties from the polymerization system by a conventional collection method.

The present invention has been brought to completion on the basis of these findings.

In one aspect of this invention, there is thus provided a high-heat-resistant, crystalline block copolymer alternately comprising (A) at least one poly(arylene thioetherketoneketone) block having predominant recurring units of the formula

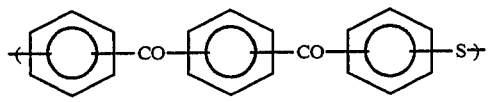

and (B) at least one poly(arylene thioether) block having predominant recurring units of the formula

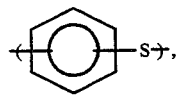

(a) the ratio of the total amount of the poly(arylene thioether) block (B) to the total amount of the poly(arylene thioetherketoneketone) block (A) ranging from 0.1 to 9 by weight, (b) the weight average molecular weight of the poly(arylene thioether) block (B) being at least 1,000, and (c) said block copolymer having a melt viscosity of 2–100,000 poises as measured at 380° C. and a shear rate of 1,200/sec.

In another aspect of this invention, there is also provided a process for the production of a high-heat-resistant, crystalline block copolymer comprising (A) at least one poly(arylene thioetherketoneketone) block and (B) at least one poly(arylene thioether) block, which comprises at least the following two steps:

i) heating in the presence of water an organic amide solvent containing a dihalogenated aromatic compound, which consists principally of a dihalobenzene, and an alkali metal sulfide, whereby a reaction mixture containing a poly(arylene thioether) prepolymer having predominant recurring units of the formula

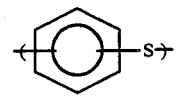

and reactive terminal groups is formed, and ii) mixing the reaction mixture, which has been obtained in the step i), with a dihalogenated aromatic compound consisting principally of a bis(halobenzoyl)benzene and, if necessary, an alkali metal sulfide, an organic amide solvent or water and heating the resultant mixture to form a poly(arylene thioetherketoneketone) block having predominant recurring units of the formula

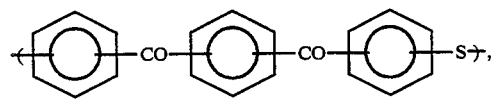

thereby obtaining the block copolymer, said first and second steps i) and ii) being conducted under the following conditions (a)-(f):

(a) in the first step i), the ratio of the water content to the amount of the charged organic amide solvent being 0.1–15 (mol/kg), the ratio of the amount of the charged dihalogenated aromatic compound to the amount of the charged alkali metal sulfide being 0.7–1.05 (mol/mol), and the polymerization being conducted until the weight average molecular weight of the poly(arylene thioether) prepolymer becomes at least 1,000, (b) in the second step, the ratio of the water content to the amount of the charged organic amide solvent being controlled within a range of 0.1–15 (mol/kg), (c) in the second step, the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that charged in the second step ii) as needed, being controlled within a range of 0.95–1.2 (mol/mol), (d) the ratio of the charged amount of the dihalogenated aromatic compound consisting principally of the dihalobenzene to the charged amount of the dihalogenated aromatic compound consisting principally of the bis(halobenzoyl)benzene being controlled within a range of 0.25–26 (mol/mol), (e) The reaction of the second step ii) being conducted within a temperature range of 150°–300° C. with the proviso that the reaction time at 210° C. and higher is not longer than 10 hours, and (f) in the second step ii), the reaction is conducted until the melt viscosity of the resulting block copolymer becomes 2–100,000 poises as measured at 380° C. and a shear rate of 1,200/sec.

In a further aspect of this invention, there is also provided a process for the production of a high-heat-resistant, crystalline block copolymer comprising (A) at least one poly(arylene thioetherketoneketone) block and (B) at least one poly(arylene thioether) block, which comprises at least the following three steps:

i) heating in the presence of water an organic amide solvent containing a dihalogenated aromatic compound, which consists principally of a dihalobenzene, and an alkali metal sulfide, whereby a reaction mixture containing a poly(arylene thioether) prepolymer having predominant recurring units of the formula

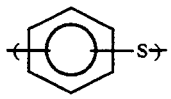

and reactive terminal groups is formed, ii) heating in the presence of water an organic amide solvent containing a dihalogenated aromatic compound, which consists principally of a bis(halobenzoyl)benzene and an alkali metal sulfide, whereby a second reaction mixture containing a poly(arylene thioetherketoneketone)prepolymer having predominant recurring units of the formula

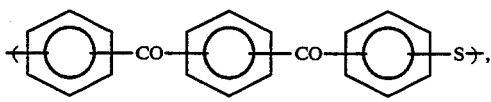

is formed, and, iii) mixing and reacting the first reaction mixture, which has been obtained in the first step i) and contains the poly(arylene thioether) prepolymer, with the second reaction mixture obtained in the second step ii) and containing the poly(arylene thioetherketoneketone) prepolymer and, if necessary, water, said first through third steps i)-iii) being conducted under the following conditions (a)-(g):

(a) in the first step i), the ratio of the water content to the amount of the charged organic amide solvent being 0.1-15 (mol/kg), the ratio of the amount of the charged dihalogenated aromatic compound to the amount of the charged alkali metal sulfide being 0.7-1.05 (mol/mol), and the polymerization being conducted until the weight average molecular weight of the poly(arylene thioether) prepolymer becomes at least 1,000, (b) in the second step, the ratio of the water content to the amount of the charged organic amide solvent being controlled within a range of 0.1-15 (mol/kg) and the reaction being conducted within a temperature range of 60°-300° C. with the proviso that the reaction time at 210° C. and higher is not longer than 10 hours, (c) in the third step, the ratio of the water content to the amount of the charged organic amide solvent being controlled within a range of 0.1-15 (mol/kg), (d) in the third step, the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that charged in the second step ii), being controlled within a range of 0.95-1.2 (mol/mol), (e) the ratio of the whole poly(arylene thioether) prepolymer to the whole poly(arylene thioetherketoneketone) prepolymer being controlled at 0.1-9 by weight, (f) the reaction of the third step iii) being conducted within a temperature range of 150°-300° C. with the proviso that the reaction time at 210° C. and higher is not longer than 10 hours, and (g) in the third step iii), the reaction is conducted until the melt viscosity of the resulting block copolymer becomes 2-100,000 poises as measured at 380° C. and a shear rate of 1,200/sec.

DETAILED DESCRIPTION OF THE INVENTION

The present invention will hereinafter be described in detail.

(Block copolymers)

Chemical structure of block copolymers

The block copolymers according to the present invention are block copolymers alternately comprising (A) at least one PTKK block having predominant recurring units of the formula

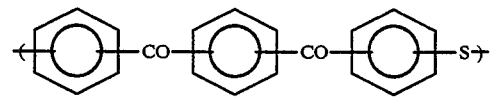

and (B) at least one PATE block having predominant recurring units of the formula

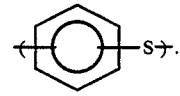

Desirably, the above recurring units are contained in a proportion of 50 wt. % or more, preferably 70 wt. % or more, most preferably 80 wt. % in the PTKK block (A) and PATE block (B), respectively.

Among these recurring units, preferred are

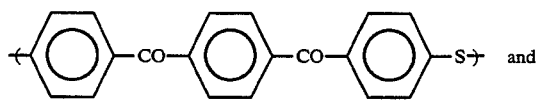

as recurring units for the block (A)

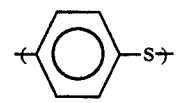

as a recurring unit for the block (B) as they can afford block copolymers especially superior from the standpoints of crystallinity, melt stability, heat resistance, mechanical properties, solvent resistance, moisture absorption resistance, etc.

Each block copolymer of the present invention can have a desired structure containing both blocks in an alternate order, such as

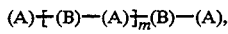

m being 0 or an integer of 1 or greater or

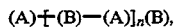

n being 0 or an integer of 1 or greater.

It is however required that the weight ratio of the total amount of blocks (B) to the total amount of blocks (A) be within a range of 0.1-9, preferably 0.3-5, more preferably 0.35-4.

The block (A) serves to impart high degrees of heat resistance and crystallinity to the block copolymer. On the other hand, the block (B) contributes to the reduction of the processing temperature, the improvement of solvent resistance and moisture absorption resistance, and the granulation while maintaining the high crystallinity. Therefore, block copolymers in each of which the weight ratio of the total amount of blocks (B) to the total amount of blocks (A) is at least 0.1 but smaller than 1, preferably at least 0.3 but smaller than 1 feature particularly good heat resistance and high crystallinity. Ratios in a range of 1-9, preferably 1-5 give block copolymers excellent especially in processability while retaining excellent crystallinity. In addition, the block copolymers can be easily collected as suitable granular materials. Moreover, the resulting block copolymers have excellent solvent resistance and moisture absorption resistance.

However, any weight ratios of the total amount of blocks (B) to the total amount of blocks (A) smaller than 0.1 are too small to achieve any sufficient reduction in processing temperature, any significant improvements in solvent resistance and moisture absorption resistance, and/or satisfactory granulation. To the contrary, any ratios greater than 9 lead to a substantial reduction in heat resistance and disturb the balancing between heat resistance and processability. Ratios outside the above range are therefore not preferred.

It is essential for the block (B) to have a weight average molecular weight of at least 1,000, preferably 1,500 or higher.

Weight average molecular weights of the block (B) lower than 1,000 lead to the formation of copolymers reduced in physical properties such as crystallinity, heat resistance and melt stability, or can hardly provide block copolymers having a high molecular weight. Such low weight-average molecular weights are therefore not preferred.

Incidentally, the weight average molecular weight of PATE blocks (B) in the present invention is determined at the stage of a prepolymer by gel permeation chromatography (GPC method).

The following measurement conditions are used.
Column: Two columns "SHODEX AT 80 M/S" arranged in series.
Solvent: α-chloronaphthalene.
Flow rate: 0.7 ml/min.
Temperature: 220° C.
Sample concentration: 0.05 wt. %.
Amount loaded: 200 μl.
Detector: hydrogen flame ionization detector (FID).
Molecular weight calibration: Polystyrene and

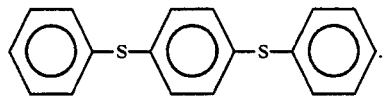

Data processing: "SIC 7000B" (manufactured by System Instruments Inc.).

The block (A) and block (B) can contain one or more recurring units other than their predominant recurring units of the formulae

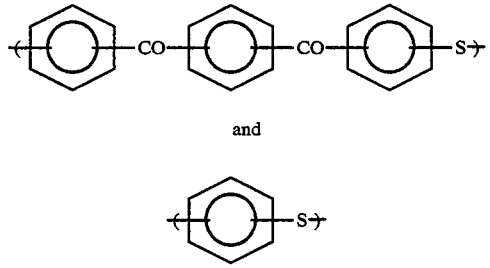

to an extent that the objects of this invention are not impaired.

In general, these other recurring units can be introduced into the block copolymers by using the corresponding various dihalogenated aromatic compounds as comonomers.

Physical properties of the block copolymers

Physical properties and other characteristics of the block copolymers according to this invention will next be described in detail from the viewpoints of melting point (processability), melt stability, crystallinity and the like.

(1) Melting point (processability)

The melting point of PTKK homopolymer powder is about 410° C. The extent of a reduction in the melting point due to copolymerization with another monomer of a different kind, $\Delta Tm = [410° C. - Tm$ (melting point of copolymer)$]$ is generally proportional to the extent of a reduction in the melt processing temperature. Accordingly, $\Delta Tm$ can be used as an index indicative of the processing temperature reducing effect, namely, processability improving effect.

$\Delta Tm$ may preferably be 10°-140° C., more preferably 20°-130° C., most preferably 25°-125° C. If $\Delta Tm$ is lower than 10° C., there is a potential problem that the processability improving effect may not be sufficient. If $\Delta Tm$ is higher than 140° C. on the other hand, there is another potential problem that the block copolymer may lose the characteristics as a heat-resistant resin. $\Delta Tm$ outside the above range is therefore not preferred.

(2) Crystallinity

One of great features of the block copolymers according to this invention resides in that they have not only excellent processability but also high crystallinity. Crystallinity imparts high heat resistance to a copolymer. To have a block copolymer equipped with high heat resistance, it is essential that the block copolymer has sufficient crystallinity.

In general, melt crystallization enthalpy $\Delta Hmc$ is proportional to the degree of crystallization when a molten polymer undergoes crystallization. On the other hand, melt crystallization temperature Tmc serves as an index of the readiness of crystallization. Therefore, the melt crystallization enthalpy ΔHmc (400° C.) and melt crystallization temperature Tmc (400° C.) of a block copolymer according to this invention as measured when cooled at a rate of 10° C./min immediately after being heated to 400° C. in an inert gas atmosphere by means of a differential scanning calorimeter (hereinafter abbreviated as "DSC") can be used as indices of the crystallinity of the block copolymer.

In addition, residual melt crystallization enthalpy, ΔHmc (400° C./10 min) and melt crystallization temperature, Tmc (400° C./10 min) measurable upon determination of the residual crystallinity, both of which will be described subsequently, can be used as indices of not only melt stability but also crystallinity.

The block copolymers of this invention may have a melt crystallization enthalpy, ΔHmc (400° C.) of at least 15 J/g, preferably at least 20 J/g, and more preferably at least 25 J/g. On the other hand, Tmc (400° C.) may desirably be at least 180° C., with at least 190° C. being more preferred. Block copolymers having ΔHmc (400° C.) smaller than 15 J/g or Tmc (400° C.) lower than 180° C. may have insufficient heat resistance as heat resistant polymers and are hence not preferred.

(3) Melt stability:

The important feature of the block copolymers according to this invention resides in that they have melt stability high enough to permit the application of conventional melt processing techniques.

Polymers of poor melt stability tend to lose their crystallinity or to undergo crosslinking or decomposition, resulting in an increase in melt viscosity, upon melt processing.

It is hence possible to obtain an index of the melt processability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically, it is possible to use as indices of the melt stability of a block copolymer its residual melt crystallization enthalpy, ΔHmc (400° C./10 min) and melt crystallization temperature, Tmc (400° C./10 min), which are determined at a cooling rate of 10° C./min after the block copolymer is held at 50° C. for 5 minutes, heated to 400° C. at a rate of 75° C./min and then held for 10 minutes at 400° C., which is higher than the melt processing temperature of the block copolymer, in an inert gas atmosphere.

In the case of a copolymer having poor melt stability, it undergoes crosslinking or the like under the above conditions, namely, when it is held for 10 minutes at the high temperature of 400° C., whereby the copolymer loses its crystallinity substantially.

The block copolymers of this invention are polymers having the physical properties that their residual melt crystallization enthalpies, ΔHmc (400° C./10 min) are at least 10 J/g, more preferably at least 15 J/g, most preferably at least 20 J/g and their melt crystallization temperatures, Tmc (400° C./10 min) are at least 170° C., more preferably at least 180° C., most preferably at least 190° C.

A block copolymer, whose ΔHmc (400° C./10 min) is smaller than 10 J/g or whose Tmc (400° C./10 min) is lower than 170° C., tends to lose its crystallinity or to induce a melt viscosity increase upon melt processing, so that difficulties are encountered upon application of conventional melt processing techniques.

Further, the ratio of melt crystallization enthalpy to residual melt crystallization enthalpy, namely, ΔHmc (400° C.)/ΔHmc (400° C./10 min) can also be used as an index of melt stability. Deterioration by heat becomes smaller as this ratio decreases. Therefore, it is preferable that ΔHmc (400° C./10 min) is at least 10 J/g and the above ratio is 5 or smaller, more preferably 3 or smaller.

(4) Melt viscosity:

In this invention, the melt viscosity $\eta^*$ of each copolymer is used as an index of its molecular weight.

Specifically, a polymer sample is filled in a Capirograph manufactured by Toyo Seiki Seisaku-Sho, Ltd. and equipped with a nozzle having an inner diameter of 1 mm and an L/D ratio of 10/1 and is preheated at 380° C. for 5 minutes. Its melt viscosity $\eta^*$ is measured at a shear rate of 1,200/sec.

The block copolymers of the present invention have a melt viscosity $\eta^*$ of 2–100,000 poises, preferably 5–50,000 poises, more preferably 10–30,000 poises.

Those having a melt viscosity $\eta^*$ lower than 2 poises have an unduly small molecular weight so that their flowability is too high to apply conventional melt processing techniques. Even if melt-formed or melt-molded products are obtained, their physical properties are considerably inferior. Such low melt viscosities are therefore not preferred. On the other hand, those having a melt viscosity $\eta^*$ higher than 100,000 poises have an unduly large molecular weight so that their flowability is too low to apply conventional melt processing techniques. Such high melt viscosities are therefore not preferred either.

(5) Solvent resistance and moisture absorption resistance:

As a still further feature of the block copolymers of the present invention, they have been improved in solvent resistance and moisture absorption resistance both of which are drawbacks of PTKK homopolymer.

PTKK homopolymer is readily dissolved in concentrated sulfuric acid at room temperature and has high hygroscopicity. In general, the block copolymers of the present invention are either only sparingly soluble or insoluble in concentrated sulfuric acid and have low hygroscopicity although affected by the ratio of the components.

To have both preferred solvent resistance and preferred moisture absorption resistance, the ratio of the total amount of PATE blocks (B) to the total amount of PTKK blocks (A) should be preferably at least 0.5, notably at least 1.

<Production Process of Block Copolymers>

A variety of processes may be contemplated for the production of the block copolymers, for example, including:

(1) A dihalogenated aromatic compound consisting principally of a bis(halobenzoyl)benzene is added to and reacted with a PATE block (B) which has been prepared in advance, whereby a PTKK block (A) is formed to yield a block copolymer.

(2) A dihalogenated aromatic compound consisting principally of a dihalobenzene is added to and reacted with a PTKK block (A) which has been prepared in advance, whereby a PATE block (B) is formed to yield a block copolymer.

(3) PTKK block (A) and PATE block (B), which have been prepared separately, are chemically combined together.

The present inventors carefully studied those processes. As a result, it has been found that the processes (1) and (3) are more suitable for obtaining the block copolymers of this invention.

A. Raw materials for block copolymers:

In the process for the production of a block copolymer of this invention, an alkali metal sulfide and a dihalogenated aromatic compound are employed as principal raw materials for the polymer and an organic amide solvent and water, including water of hydration, as reaction polymerization media.

(1) Alkali metal sulfide:

Illustrative examples of the alkali metal sulfide useful in the practice of this invention include lithium sulfide, sodium sulfide, potassium sulfide, rubidium sulfide, cesium sulfide and mixtures thereof.

Among these alkali metal sulfides, sodium sulfide, especially sodium sulfide pentahydrate is preferred. An alkali metal sulfide which can be formed from an alkali metal hydrosulfide and an alkali metal hydroxide can also be used.

(2) Dihalogenated aromatic compound:

The dihalogenated aromatic compound employed in the present invention for the formation of the PTKK block (A), including a PTKK prepolymer, consists principally of one or more bis(halobenzoyl)benzenes. Preferably, 1,4-bis(4-chlorobenzoyl)benzene, 1,4-bis(4-bromobenzoyl)benzene, 1,3-bis(4-chlorobenzoyl)benzene, 1,3-bis(4-bromobenzoyl)benzene and the like can be used either singly or in combination.

The dihalogenated aromatic compound used for the formation of the PATE block (B), including a PATE prepolymer, consists principally of a dihalobenzene such as p-dihalobenzene or m-dihalobenzene. Preferably, p-dichlorobenzene and/or m-dichlorobenzene is used.

As other copolymerizable dihalogenated aromatic compounds, may be mentioned, for example, dihalobenzophenones, bis(halobenzoylphenyl) ethers, bis(halobenzoylphenyl) thioethers, dihaloalkylbenzenes, dihalobiphenyls, dihalodiphenyl sulfones, dihalonaphthalenes, bis(halogenated phenyl)methanes, dihalopyridines, dihalothiophenes and dihalobenzonitriles, and mixtures thereof.

As substituent halogen atoms, chlorine or bromine atoms may be used preferably from the economical viewpoint. Within a range not giving too much effects to the cost, a small amount of a fluorine compound may also be used in combination.

It is also permissible to produce a block copolymer, which has a crosslinked and/or branched structure introduced therein, by causing a trihalogenated or higher polyhalogenated compound to exist in a reaction system in such a small amount that the processability and physical properties of the copolymer may not be impaired to any substantial extent. As illustrative examples of the trihalogenated or higher polyhalogenated compound usable for the above purpose, may be mentioned bis(dichlorobenzoyl)benzene, bis(dibromobenzoyl)benzene, trichlorobenzophenone, tribromobenzophenone, tetrachlorobenzophenone, tetrabromobenzophenone, trichlorobenzene, tribromobenzene and tetrachlorobenzene and mixtures thereof.

(3) Organic amide solvent:

As reaction media useful for the production process of the block copolymers according to this invention, aprotic polar organic solvents having excellent heat stability and alkali resistance can be used. Of these, organic amide solvents, including carbamic amides, are preferred.

As such organic amide solvents, may be mentioned N-methylpyrrolidone, N-ethylpyrrolidone, hexamethylphosphoric triamide, tetramethylurea, dimethylimidazolidinone, dimethylacetamide, $\epsilon$-caprolactam, etc. They may also be used as a mixed solvent.

Among these organic amide solvents, N-methylpyrrolidone or N-ethylpyrrolidone or their mixed solvent is particularly preferred from the viewpoint of the readiness in obtaining a melt-stable block copolymer, thermal and chemical stability, economy, etc.

B. Polymerization process and reaction conditions:

For the preparation of the PATE prepolymer in this invention, for the reaction in which the PTKK block is formed in the presence of the PATE prepolymer, for the preparation of the PTKK prepolymer and for the reaction in which the PTKK prepolymer and PATE prepolymer are combined together to form a block copolymer, it is necessary to conduct the reactions under special conditions, namely, by maintaining the water content at a specific level in the reaction systems, controlling the monomer compositions suitably, regulating the polymerization temperatures appropriately, and limiting the reaction time at high temperatures. It is effective for the production of block copolymers having still more preferable physical properties, for example, to choose a suitable material for the reactor and to apply stabilization treatment in a final stage of the reaction.

Unless these reaction conditions are suitably controlled, it is difficult to provide crystalline block copolymers having melt stability suitable for conventional melt processing.

<Preparation processes Of Prepolymers>

(1) PATE prepolymer:

The PATE prepolymer employed as a raw material for the block copolymer and having the particular average molecular weight and terminal thiolate group(s) and/or thiol groups can be prepared by reacting an alkali metal sulfide and a dihalogenated aromatic compound, which consists principally of a dihalobenzene, in the presence of water in an organic amide solvent under the following conditions (a)–(c):

(a) The ratio of the water content to the amount of the charged organic amide solvent should be within a range of 0.1–15 (mol/kg), preferably 0.3–12 (mol/kg), more preferably 0.5–11 (mol/kg).

(b) The ratio of the amount of the charged dihalogenated aromatic compound to the amount of the charged alkali metal sulfide should be within a range of 0.7–1.05 (mol/mol), preferably at least 0.70 but smaller than 1.0 (mol/mol), more preferably at least 0.70 but smaller than 0.95 (mol/mol).

(c) The reaction should be conducted at a temperature within a range of 200°–280° C., preferably 210°–270° C., and should be continued until the weight average molecular weight of the resulting prepolymer reaches at least 1,000, preferably 1,500 or greater.

When the ratio of the amount of the charged dihalogenated aromatic compound to the amount of the charged alkali metal sulfide is set at 0.95 or greater (mol/mol), notably 1.0 or greater (mol/mol) as the above condition (b), the reaction product may be treated further with the alkali metal sulfide to prepare a PATE prepolymer containing more thiolate groups as reactive terminal groups.

To obtain the block copolymers of this invention, the ratio of terminal thiolate groups, including thiol groups if any, to terminal halogen atoms in the PATE prepolymer chain is at least 0.5 (mol/mol), more preferably at lest 2 (mol/mol), most preferably at least 5 (mol/mol). If this ratio is smaller than 0.5, the reactivity at the terminals of the PATE prepolymer is insufficient thereby to make it difficult to obtain a block copolymer. The PATE prepolymer may contain some crosslinked structure and/or branched structure introduced typically by allowing a trihalobenzene or higher polyhalobenzene to present in a small amount in the polymerization reaction system.

(2) PTKK prepolymer:

PTKK prepolymer employed as a raw material for the block copolymer of this invention can be prepared in the following manner.

Namely, the PTKK prepolymer can be prepared by reacting an alkali metal sulfide with a dihalogenated aromatic compound, which consists principally of a bis(halobenzoyl)benzene, in the presence of water in an organic amide solvent under the following conditions (a)-(b):

(a) The ratio of the water content to the amount of the charged organic amide solvent should be within a range of 0.1-15 (mol/kg).

(b) The reaction should be conducted at a temperature within a range of 60°-300° C. with the proviso that the reaction time at 210° C. and higher should not be longer than 10 hours.

The PTKK prepolymer may contain some crosslinked structure and/or branched structure introduced typically by allowing a trihalobenzophenone or higher polyhalobenzophenone to present in a small amount in the polymerization reaction system.

<Production Process of block Copolymers (Process No.1)>

As a production process for each block copolymer according to this invention, may be described the process in which a PATE prepolymer is prepared in advance and at least one PTKK block is formed in the presence of the PATE prepolymer to yield a block copolymer. Essentially, this process comprises the following two-step process:

i) heating in the presence of water an organic amide solvent containing a dihalogenated aromatic compound, which consists principally of a dihalobenzene, and an alkali metal sulfide, whereby a reaction mixture containing a PATE prepolymer having predominant recurring units of the formula

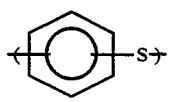

and reactive terminal groups is formed, and ii) mixing the reaction mixture, which has been obtained in the step i), with a dihalogenated aromatic compound consisting principally of a bis(halobenzoyl)benzene and, if necessary, an alkali metal sulfide, an organic amide solvent or water and heating the resultant mixture to form a PTKK block having predominant recurring units of the formula

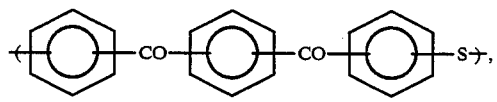

thereby obtaining the block copolymer, said first and second steps i) and ii) being conducted under the following conditions (a)-(f):

(a) in the first step i), the ratio of the water content to the amount of the charged organic amide solvent being 0.1-15 (mol/kg), the ratio of the amount of the charged dihalogenated aromatic compound to the amount of the charged alkali metal sulfide being 0.7-1.05 (mol/mol), and the polymerization being conducted until the weight average molecular weight of the PATE prepolymer becomes at least 1,000, (b) in the second step, the ratio of the water content to the amount of the charged organic amide solvent being controlled within a range of 0.1-15 (mol/kg), (c) in the second step, the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that charged in the second step ii) as needed, being controlled within a range of 0.95-1.2 (mol/mol), (d) the ratio of the charged amount of the dihalogenated aromatic compound consisting principally of the dihalobenzene to the charged amount of the dihalogenated aromatic compound consisting principally of the bis(halobenzoyl)benzene being controlled within a range of 0.25-26 (mol/mol), (e) the reaction of the second step ii) being conducted within a temperature range of 150°-300° C. with the proviso that the reaction time at 210° C. and higher is not longer than 10 hours, and (f) in the second step ii), the reaction is conducted until the melt viscosity of the resulting block copolymer becomes 2-100,000 poises as measured at 380° C. and a shear rate of 1,200/sec.

As has been described above, it is also possible to obtain a block copolymer in the second step by mixing the reaction mixture, which has been obtained in the first step, with a dihalogenated aromatic compound consisting principally of a bis(halobenzoyl)benzene and then heating the resultant mixture without additional incorporation of the alkali metal sulfide, the organic amide solvent or water. Needless to say, the alkali metal sulfide, the organic amide solvent and/or water can also be added in the second step.

<Production Process of Block Copolymers (Process No.2)>

As another production process for each block copolymer according to this invention, may be described the process in which PATE prepolymer and PTKK prepolymers are prepared in advance and are then reacted to combine them together. This process is practically the following 3-step process:

i) heating in the presence of water an organic amide solvent containing a dihalogenated aromatic compound, which consists principally of a dihalobenzene, and an alkali metal sulfide, whereby a reaction mixture containing a PATE prepolymer having predominant recurring units of the formula

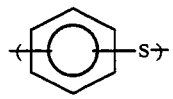

and reactive terminal groups is formed, ii) heating in the presence of water an organic amide solvent containing a dihalogenated aromatic compound, which consists principally of a bis(halobenzoyl)benzene and an alkali metal sulfide, whereby a second reaction mixture containing a poly (arylene thioetherketoneketone) prepolymer having predominant recurring units of the formula

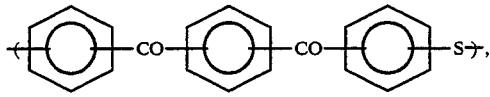

is formed, and, iii) mixing and reacting the first reaction mixture, which has been obtained in the first step i) and contains the poly(arylene thioether) prepolymer, with the second reaction mixture obtained in the second step ii) and containing the PTKK prepolymer and, if necessary, water, said first through third steps i)–iii) being conducted under the following conditions (a)–(g):

(a) in the first step i), the ratio of the water content to the amount of the charged organic amide solvent being 0.1–15 (mol/kg), the ratio of the amount of the charged dihalogenated aromatic compound to the amount of the charged alkali metal sulfide being 0.7–1.05 (mol/mol), and the polymerization being conducted until the weight average molecular weight of the PATE prepolymer becomes at least 1,000, (b) in the second step, the ratio of the water content to the amount of the charged organic amide solvent being controlled within a range of 0.1–15 (mol/kg) and the reaction being conducted within a temperature range of 60°–300° C. with the proviso that the reaction time at 210° C. and higher is not longer than 10 hours, (c) in the third step, the ratio of the water content to the amount of the charged organic amide solvent being controlled within a range of 0.1–15 (mol/kg), (d) in the third step, the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that charged in the second step ii), being controlled within a range of 0.95–1.2 (mol/mol), (e) the ratio of the whole PATE prepolymer to the whole PTKK prepolymer being controlled at 0.1–9 by weight, (f) the reaction of the third step iii) being conducted within a temperature range of 150°–300° C. with the proviso that the reaction time at 210° C. and higher is not longer than 10 hours, and (g) in the third step iii), the reaction is conducted until the melt viscosity of the resulting block copolymer becomes 2–100,000 poises as measured at 380° C. and a shear rate of 1,200/sec.

<Reaction Conditions>

The reaction conditions employed in the synthesis stages of the PTKK prepolymer and block copolymer, said reaction conditions being essential features of the process of this invention for the production of the block copolymer, will hereinafter be described in further detail.

(1) Water content:

In the processes for the preparation of the PTKK prepolymer of this invention, the water content in the reaction system may desirably be within a range of 0.1–15 moles, preferably 1.0–12 moles, more preferably 2.5–10 moles, per kg of the amount of the charged organic amide solvent.

Water contents lower than 0.1 mole can hardly provide a PTKK prepolymer having high melt stability and moreover tend to induce decomposition in the polymerization reactions. On the other hand, water contents higher than 15 moles result in a reduction in the reaction rates and are therefore uneconomical.

The water content in the second step ii) of the two step process (Process No. 1), may desirably be in a range of 0.1–15 moles, more preferably 2.5–15 moles, most preferably 3.5–14 moles per kg of the charged amount of the organic amide solvent. If the water content is smaller than 0.1 mole or greater than 15 moles, it is difficult to obtain a block copolymer intended in the present invention.

In addition, in the third step iii) of the three step process (Process No. 2), the water content in the reaction system may desirably be 0.1–15 moles, more preferably 2.5–15 moles, most preferably 3.5–14 moles per kg of the charged amount of the organic amide solvent.

Water contents smaller than 0.1 mole can hardly provide a block copolymer having high melt stability and tend to induce decomposition during the reaction. On the other hand, water contents greater than 15 moles lead to a reduced reaction velocity and result only in a block copolymer having a low polymerization degree.

In order to adjust the content of water and/or that of the organic amide solvent in a reaction system, they may be reduced by distillation or the like or may be increased by adding water and/or the organic amide solvent prior to the initiation of a polymerization reaction.

(2) Composition of monomers charged:

The ratio of the total amount of the dihalogenated aromatic compound to the total amount of the alkali metal sulfide, both charged upon synthesis of the block copolymer, may desirably be in a range of 0.95–1.2 (mol/mol), more preferably 0.97–1.10 (mol/mol), most preferably 0.98–1.05 (mol/mol).

Here, the term "the total amount of the charged alkali metal sulfide" means the sum of the amount of the alkali metal sulfide charged upon synthesis of the PTKK prepolymer and/or the PATE prepolymer and the amount of the alkali metal sulfide charged upon synthesis of the block copolymer.

Ratios smaller than 0.95 can hardly provide a block copolymer having excellent melt stability and tend to induce decomposition during the reaction. On the other hand, ratios greater than 1.2 can only provide block copolymers having a low molecular weight.

Regarding the ratio of the amount of the charged dihalogenated aromatic compound to the amount of the charged alkali metal sulfide upon synthesis of the PTKK prepolymer may be preferably at least 1.15 (mol/mol), more preferably at least 1.2 (mol/mol), particularly at least 1.3 (mol/mol).

In the present invention, the bis(halobenzoyl)benzene serves to impart high degrees of heat resistance and crystallinity to the copolymer while the dihalobenzene lowers the processing temperature while retaining the high crystallinity and contributes to the improvement of solvent resistance and moisture absorption resistance and also to the granulation.

It is therefore necessary in the production process No. 1 for the block copolymer that the molar ratio of the amount of the dihalogenated aromatic compound charged in the first step and consisting principally of the dihalobenzene to the amount of the dihalogenated aromatic compound charged in the second step and consisting principally of the bis(halobenzoyl)benzene be in a range of 0.25–26 (mol/mol), with a range of 0.9–14 being preferred and a range of 1–12 being more preferred.

Copolymers in which the above-mentioned ratio is in a range of 0.25–2.9, preferably 0.9–2.9 have the characteristic properties that they are excellent especially in heat resistance and high in crystallinity. On the other hand, ratios in a range of 3–26, preferably 3–14 lead to copolymers which retain excellent crystallinity and are superb especially in processability. Further, the polymers can be obtained as suitable granular materials so that they can be easily collected. Moreover, the polymers thus obtained have excellent solvent resistance and moisture absorption resistance.

However, ratios smaller than 0.25 result in a copolymers whose processing temperatures have not been reduced to sufficient extent, whose solvent resistance and moisture absorption resistance have not been improved to sufficient extents or whose granulation have not proceeded to sufficient extent. If the ratio exceeds 26 conversely, heat resistance is reduced significantly so that the balance between heat resistance and processability is disturbed. Neither such small ratios nor such large ratios are hence preferred.

Further, it is also necessary in the third step of the production process No. 2 for the block copolymer that the weight ratio of the whole poly(arylene thioether) prepolymer to the entire poly(arylene thioether-ketoneketone) prepolymer is set in a range of 0.1–9, with a range of 0.3–5 being preferred and a range of 0.35–4 being more preferred.

Block copolymers in which the above-mentioned ratio is at least 0.1 but smaller than 1, preferably at least 0.3 but smaller than 1 have the characteristic properties that they are excellent especially in heat resistance and high in crystallinity. Ratios in a range of 1–9, preferably 1–5 result in block copolymers which retain excellent crystallinity and are superb especially in processability. Further, the polymers can be obtained as suitable granular materials so that they can be easily collected. Moreover, the polymers thus obtained have excellent solvent resistance and moisture absorption resistance.

However, ratios smaller than 0.1 result in copolymers whose processing temperatures have not been reduced to sufficient extent, whose solvent resistance and moisture absorption resistance have not been improved to sufficient extents or whose granulation have not proceeded to sufficient extent. If the ratio exceeds 9 conversely, heat resistance is reduced significantly so that the balance between heat resistance and processability is disturbed. Neither such small ratios nor such large ratios are therefore preferred.

Regarding the ratio of the charged amount of the aromatic amide solvent to the charged amount of the alkali metal sulfide upon syntheses of the PATE prepolymer and the block copolymer, it is generally desired to use the organic amide solvent in an amount range of 0.3–5 kg, more preferably 0.4–3 kg per mole of the charged amount of the alkali metal sulfide although this varies depending on the composition of the dihalogenated aromatic compounds.

Further, as to the ratio of the charged amount of the organic amide solvent to the charged amount of the alkali metal sulfide upon synthesis of the PTKK prepolymer, it is desired to use the organic amide solvent in an amount range of 0.6–100 kg, more preferably 1.0–50 kg per mole of the charged amount of the alkali metal sulfide.

Where the alkali metal sulfide is lost by a distilling operation or the like prior to the initiation of the reaction, the term "the amount of the charged alkali metal sulfide" as used herein means the remaining amount which is obtained by subtracting the loss from the amount actually charged. Furthermore, the term "the amount of the charged dihalogenated aromatic compound" as used herein should be interpreted not to include the amount of the halogen-substituted aromatic compound added in the final stage of the reaction for effecting stabilizing treatment which is to be described subsequently.

(3) Reaction temperature and reaction time:

In the process of this invention for the preparation of the PTKK prepolymer, the reaction is conducted at a temperature within a range of 60°–300° C., with 150°–290° C. being preferred and 170°–260° C. more preferred.

In the process of this invention for the production of the block copolymer, the reaction is conducted at a temperature in a range of 150°–300° C., preferably 200°–290° C., and more preferably 210°–280° C.

Reaction temperatures lower than 150° C. require an unduly long time to obtain the block copolymer and are therefore economically disadvantageous. On the other hand, reaction temperatures higher than 300° C. can hardly obtain the block copolymer in a form excellent in melt stability and moreover involve a potential problem of decomposition during the reaction.

The polymerization time required for obtaining a PTKK prepolymer or block copolymer of a desired molecular weight becomes shorter as the polymerization temperature increases but becomes longer as the polymerization temperature decreases. Accordingly, it is generally advantageous to conduct the polymerization at a temperature of 210° C. or higher from the viewpoint of productivity. It is however not preferred to continue the reaction at a temperature of 210° C. or higher for 10 hours or longer, because a PTKK prepolymer or block copolymer having excellent melt stability can hardly be obtained under such conditions.

(4) Reactor:

In the process of this invention for the production of each of the PTKK prepolymer and block copolymer, it is preferable to use, as a reactor (including equipment employed for provisional procedures of the polymerization reaction, for example, those required for dehydration and the like), a reactor which is made of a corrosion-resistant material at least at portions with which the reaction mixture is brought into direct contact. The corrosion-resistant material is supposed to be inert so that it does not react with the reaction mixture.

Preferable examples of the corrosion-resistant material include titanium materials such as titanium and titanium-containing alloys, nickel-containing corrosion-resistant materials, for example, Hastelloy C (a heat-resistant nickel alloy made by Haynes Stellite Company; nickel-molybdenum-chromium-iron-alloy containing about 55–60% of nickel, about 15–19% of molybdenum, about 13–16% of chromium) and austenitic steels (for example, "Carpenter 20", a special austenitic steel, containing about 28–38% of nickel, about 19–21% of chromium and about 3–4% of copper and further, molybdenum, etc.

Of these, it is particularly preferred to use a reactor lined with a titanium material.

The use of a reactor made of a corrosion-resistant material such as that described above makes it possible to obtain a block copolymer having excellent melt stability and a high molecular weight.

(5) Treatment in the final stage of the reaction:

Although a block copolymer having excellent melt stability can be obtained by the above-described production process, the block copolymer can be obtained in a form improved further in melt stability by adding a certain kind of halogen compound to the reaction system and causing it to undergo a reaction in a final stage of the reaction.

Illustrative of the halogen compound include halogenated alkane compounds having 1–3 carbon atoms and halogen-substituted aromatic compounds. It is particularly preferable to use at least one halogen-substituted aromatic compound which contains at least one substituent group having electron-withdrawing property at least equal to —CO— group.

Illustrative examples of such a halogen-substituted aromatic compound may include bis(halobenzoyl)benzenes, dihalobenzophenones, dihalodiphenylsulfones, monohalobenzophenones and the like, and mixtures thereof.

It is desirable to conduct the final-stage treatment by adding the above-mentioned halogen-substituted aromatic compound to the polymerization reaction system in an amount of 0.1–20 moles, preferably 0.5–10 moles per 100 moles of the charged alkali metal sulfide in the final stage of the reaction and then allowing it to react at 60°–300° C., more preferably 150°–290° C., most preferably 220°–280° C. for 0.1–20 hours, more preferably 0.1–8 hours.

(6) Conditions for the granulation:

Another principal feature of the process of this invention for the production of the block copolymer resides in that the block copolymer can be obtained as granules by suitably choosing the aforementioned reaction conditions for the block copolymer further. Reaction conditions for obtaining at least 50 wt. % of the resulting block copolymer as granules collectable by means of a sieve having an opening size of 75 μm (200 mesh) will next be described in detail.

(i) Weight ratio of the total amount of block or blocks (B) to the total amount of block or blocks (A) in the block copolymer:

The weight proportion of block or blocks (B) in the block copolymer is an important parameter since each block (B) contributes to the granulation. When it is desired to obtain the block copolymer of this invention as granules, it is necessary to control the ratio of the total amount of block or blocks (B) to the total amount of block or blocks (A) at 0.3–9, preferably 0.5–6, more preferably 1.0–4, all by weight.

If this ratio is smaller than 0.3, it becomes difficult to obtain the block copolymer as granules. Ratios greater than 9 however lead to a substantial reduction in the heat resistance of the block copolymer. Such small and large ratios are both not preferred.

(ii) Reaction temperature and time for the granulation:

To obtain the block copolymer as granules, it is desirable to raise the reaction temperature to at least 240°–290° C., preferably 250°–290° C. in the course of the reaction or in a final stage of the reaction.

Reaction temperatures lower than 240° C. make it difficult to obtain the block copolymer as granules. On the other hand, it is difficult to obtain the block copolymer in a form excellent in melt stability if the reaction temperature is higher than 290° C.

The time required for obtaining the block copolymer as desired granules becomes shorter as the reaction temperature increases. Conversely, it becomes longer as the reaction temperature decreases. Therefore, it is generally advantageous from the viewpoint of productivity to conduct the reaction at a high temperature of 250° C. or higher. It however becomes difficult to obtain the block copolymer in a form excellent in melt stability if the reaction at high temperatures of 250° C. and higher is continued for 7 hours or longer.

C. Collection of block copolymers:

To collect the block copolymer from the reaction mixture, the following method can be followed. Namely, after completion of the reaction including the treatment in the final stage if applied, the reaction mixture is subjected to flushing and/or distillation whereby the solvent is removed either partly or wholly to concentrate the reaction mixture. If necessary, the concentrate may be heated to remove any remaining solvent. The resulting solid or concentrate is washed with water and/or an organic solvent to eliminate soluble components such as salts formed in the reaction. The residue is again dried under heat to collect the polymer.

By suitably choosing the reaction conditions in the process of this invention for the production of the block copolymer, at least 50 wt. % of the resulting block copolymer can be obtained as granules which can be captured on a screen having an opening size of 75 μm (200 mesh), more preferably 106 μm (140 mesh), most preferably 150 μm (100 mesh).

As has been described above, the block copolymer can be easily collected as granules by a screen or the like from the reaction mixture after completion of the reaction. The granular polymer thus collected is washed with water and/or an organic solvent and then dried under heat to obtain it in a dry form. Since the block copolymer is in a granular form and has excellent handling property, it permits easy separation, water washing, transportation, metering and the like.

ADVANTAGES OF THE INVENTION

The present invention can economically provide block copolymers which have excellent heat resistance, processability, handling property and solvent resistance and are crystalline.

The high-heat-resistant, crystalline block copolymers can be used for various molded or otherwise formed articles and like products.

EXAMPLES

The present invention will hereinafter be described in further detail by the following examples and comparative examples. It should however be borne in mind that the present invention is not limited to the following examples only.

Example 1

(Production Process No. 1)

(Synthesis of PATE prepolymer)

A titanium-lined reactor was charged with 3.2 kg of hydrated sodium sulfide (water content: 53.9 wt. %) and 6.00 kg of N-methylpyrrolidone (hereinafter abbreviated as "NMP"). While gradually heating the contents to 203° C. in a nitrogen gas atmosphere, 1,345 g of water, 1,004 g of NMP and 0.36 mole of hydrogen sulfide were distilled out. Thereafter, 132 g of water were added. A liquid mixture consisting of 2.45 kg of p-dichlorobenzene (hereinafter abbreviated as "PDCB" and 4.26 kg of NMP was then fed, followed by polymerization at 220° C. for 10 hours (PDCB/sodium sulfide=0.90 mol/mol; water content/NMP=3.0 mol/kg).

A portion of 13.67 kg of the reaction slurry $S_1$, which contained a prepolymer ($P_1$) of poly(p-phenylene thioether), was sampled out and then poured into water to have the prepolymer precipitated. The prepolymer was collected by filtration, thoroughly washed with distilled water and dried under reduced pressure, whereby a sample was obtained for the measurement of the molecular weight. The weight average molecular weight of Prepolymer $P_1$ was 4,700.

The amount of PDCB remaining in the reaction slurry as determined by gas chromatography was 0.4 wt. % of the charged amount. Further, another portion of the prepolymer-containing reaction slurry was taken out and active terminal groups were measured by a method which will be set out subsequently.

The concentration of terminal thiolate groups, including terminal thiolate groups and terminal thiol groups, was $410 \times 10^{-6}$ equivalent per gram of the prepolymer, while the concentration of terminal chlorine atoms was $31 \times 10^{-6}$ equivalent per gram of the prepolymer. The ratio of the terminal thiolate groups to the terminal halogen atoms was 13.

Analytical methods:

<Analysis of Terminal Thiol Groups or Thiolate Groups>

After completion of the polymerization reaction of the prepolymer, a portion of the reaction slurry—liquid reaction mixture—was sampled out and then poured into water to have the prepolymer precipitated. The prepolymer was collected by filtration, washed in distilled water and then treated with dilute hydrochloric acid, whereby terminal thiolate groups were converted into thiol groups. The resulting prepolymer was washed for 30 minutes in distilled water and for additional 30 minutes in acetone and then dried at room temperature under reduced pressure in a vacuum drier, thereby obtaining a prepolymer sample. Right after that, the prepolymer in a range of 10 mg-1 gram was weighed and placed in a stopper-equipped test tube, followed by the addition of 2.5 ml of an acetone solution consisting of 2.5 ml of acetone and 20 mmol of iodoacetamide. The test tube was hermetically closed and then heated at 100° C. for 60 minutes. The test tube was thereafter cooled with cold water and opened. The liquid-phase portion was separated. The absorbance at 450 nm (i.e., the absorbance of iodine) was measured by means of a spectrophotometer.

Using a calibration curve prepared in advance with respect to the thiol compound

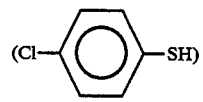

as a standard, the concentration of terminal thiol groups was calculated from the absorbance. (The amount of each sample should be chosen suitably so that the concentration of thiol groups in a corresponding acetone slurry falls within a range of 0.1-0.3 mmol.) Analysis was conducted three times on the same dried sample to determine the average value of the concentration of terminal thiol groups.

<Analysis of Terminal Halogen Groups>

Quantitative analysis of terminal halogen atoms was conducted using an X-ray fluorescence analyzer (model: "3080E2"; manufactured by Rigaku Denki Kabushiki Kaisha).

(Synthesis of block copolymer)

A titanium-lined 1-l reactor was charged with 2.25 g of hydrated sodium sulfide (water content: 53.9 wt. %), 28.9 g of 1,4-bis(4-chlorobenzoylbenzene) (product of Junsei Chemical Co., Ltd.; hereinafter abbreviated as "14-BCBB"), 455 g of the reaction slurry ($S_1$) described above, 325 g of NMP and 73 g of water. After the reactor being purged with nitrogen gas, the contents were heated to 260° C. at which they were polymerized for 2 hours.

The reaction conditions employed upon synthesis of the block copolymer were as follows:

(1) The molar ratio of the total amount of the charged dihalogenated aromatic compounds [the sum of the amount of PDCB charged upon synthesis of the prepolymer ($P_1$) and the amount of 1,4-BCBB charged upon synthesis of the block copolymer] to the total amount of the charged alkali metal sulfide [the sum of the amount of sodium sulfide charged and available upon synthesis of the prepolymer ($P_1$) and the amount of sodium sulfide charged upon synthesis of the block copolymer] was 1.01.

(2) The ratio of the amount of PDCB charged upon synthesis of the prepolymer ($P_1$) to the amount of 1,4-BCBB was about 2.8 (=74/26) by weight and about 6.8 by mole.

(3) The ratio of the water content to the organic amide (NMP) was about 8.0 mol/kg.

(Collection of block copolymer)

The resultant reaction mixture in the form of a slurry was diluted with a substantially equiamount of NMP and the granular polymer thus obtained was collected by a screen having an opening size of 150 μm (100 mesh). The polymer was washed three times with acetone and further three times with water, and then dried at 100° C. for 24 hours to obtain a block copolymer (B₁). The collection rate was 78%.

(Inherent properties of Block Copolymer B₁)

The block copolymer (B₁) was in the form of granules having an average size of 500 μm and had a bulk density of 0.33 g/ml. For its granular shape, electrostatic caking was reduced substantially compared to fine polymer powder.

By an infrared (IR) spectrum analysis, a strong absorption peak attributed to ketone group was observed at 1660 cm$^{-1}$. Wide angle X-ray diffraction which was conducted using "RAD-B System" manufactured by Rigaku Denki Kabushiki Kaisha showed a diffraction pattern corresponding to the block copolymer, said pattern being apparently different from that of the corresponding PATE homopolymer or PTKK homopolymer or a blend thereof.

The content of sulfur in Block Copolymer B₁ was determined using a sulfur analyzer ("EMIA-510"; manufactured by Horiba, Ltd.).

The weight fraction Wb of the recurring units $$\text{\textendash}\!\!\left(\!\!\bigcirc\!\!-\!S\!\right)\!\!\text{\textendash}$$

in the block copolymer can be calculated in accordance with the following equation:

$$W_b = \frac{W - W_1}{W_2 - W_1} \times 100$$

wherein the individual marks have the following meanings:

W: weight fraction of sulfur in block copolymer,
W₁: weight fraction of sulfur in PTKK recurring unit(s), and
W₂: weight fraction of sulfur in PATE recurring unit(s).

By introducing a measured value W=23.9% and calculated values W₁=10.1% and W₂=29.6% into the above equation, $W_b$ was determined to be 71%.

(Physical properties of block copolymer)

Shown collectively in Table 1.

Example 2

(Production Process No. 2)

(Synthesis of PTKK prepolymer)

A titanium-lined 1-l reactor was charged with 0.0814 mole of 1,4-BCBB, 0.0133 mole of hydrated sodium sulfide (water content: 53.9 wt. %), 28 g of water and 325 g of NMP. After the reactor being purged with nitrogen gas, the contents were maintained at 180° C. for 10 minutes to react them (water content/NMP=about 5 mol/kg), whereby a reaction slurry (KS₁) containing a PTKK prepolymer (K₁) was obtained.

(Synthesis of block copolymer)

A titanium-line 1-l reactor was charged with 455 g of Reaction Slurry S₁ containing PATE Prepolymer P₁ prepared in Example 1, 385 g of Reaction Slurry KS₁ containing PTKK Prepolymer K₁ and 45 g of water. After the reactor being purged with nitrogen gas, the contents were maintained at 260° C. for 2 hours so that they were reacted.

The reaction conditions upon synthesis of the block copolymer were as follows:

(1) The molar ratio of the total amount of the charged dihalogenated aromatic compounds [the sum of the amount of PDCB charged upon synthesis of Prepolymer P₁ and the amount of 1,4-BCBB charged upon synthesis of PTKK Prepolymer (K₁)] to the total amount of the charged alkali metal sulfide [the sum of the amount of sodium sulfide charged upon synthesis of Prepolymer P₁ and the amount of sodium sulfide charged upon synthesis of PTKK Prepolymer K₁] was 1.01.

(2) The weight ratio of PATE blocks to PTKK blocks was approximately 70:30.

(3) The ratio of the water content to the charged organic amide (NMP) was 8 mol/kg.

(Collection of block copolymer)

The resultant reaction mixture in the form of a slurry was caused to pass through a screen having an opening size of 150 μm (100 mesh), whereby the granular polymer was collected. The polymer was washed three times with acetone and further three times with water, and then dried at 100° C. for 24 hours to obtain a granular polymer (B₂) having an average size of 750 μm. The collection rate was 65%.

(Physical properties of block copolymer)

Shown collectively in Table 1.

Example 3

(Production Process No. 2)

(Synthesis of PATE prepolymer)

A reaction slurry S₂ containing a prepolymer P₂ of poly(p-phenylene thioether) was obtained in a similar manner to the synthesis of the PATE prepolymer in Example 1 except that the charged molar ratio of PDCB to sodium sulfide was changed to 0.94. The weight average molecular weight of Prepolymer P₂ was 7100. The ratio of terminal thiolate groups to terminal halogen atoms was 5.

(Synthesis of PTKK prepolymer)

A titanium-lined 1-l reactor was charged with 0.3 mole of 1,3-bis(4-chlorobenzoyl)benzene (product of Junsei Chemical Co., Ltd.; hereinafter abbreviated as "1,3-BCBB"), 0.2 mole of hydrated sodium sulfide (water content: 53.6 wt. %), 22 g of water and 450 g of NMP. After the reactor being purged with nitrogen gas, the contents were maintained at 220° C. for 2 hours for their reaction (water content/NMP=about 5 mol/kg) to obtain a reaction slurry (KS₂) containing a PTKK prepolymer (K₂).

(Synthesis of block copolymer)

A block copolymer $B_3$ was synthesized, collected and dried under similar conditions to Example 2 except that the individual prepolymers and water were charged in a titanium-lined 1-l reactor to give a PATE block/PTKK block ratio of 60:40 (weight ratio) and a water content/NMP ratio of 10 mol/kg and the prepolymers were reacted at 255° C. for 2 hours.

(Physical properties of block copolymer)

Shown collectively in Table 1.

Example 4

(Production Process No. 2)

(Synthesis of PTKK prepolymer)

A titanium-lined 1-l reactor was charged with 0.1212 mole of 1,4-BCBB, 0.0914 mole of hydrated sodium sulfide (water content: 53.9 wt. %), 35.3 g of water and 485 g of NMP, followed by polymerization in a similar manner to Example 2 so that a reaction slurry containing a PTKK prepolymer was prepared.

(Synthesis of block copolymer)

A titanium-lined 1-l reactor was charged with Reaction Slurry $S_1$, which had been prepared in Example 1 and contained PATE Prepolymer $P_1$, and the above-prepared reaction slurry containing the PTKK prepolymer to give a PATE block/PTKK block weight ratio of 40:60, followed by the addition of water and NMP to achieve similar block copolymer synthesis conditions to Example 2. Polymerization, post treatment and drying were then conducted as in Example 2, whereby a block copolymer $B_4$ was obtained.

(Physical properties of block copolymer)

Shown collectively in Table 1.

Example 5

(Production Process No. 2)

(Synthesis of PATE prepolymer)

A reaction slurry $S_3$ containing a prepolymer $P_3$ of poly(p-phenylene thioether) was obtained in a similar manner to the synthesis of the PATE prepolymer in Example 1 except that the charged molar ratio of PDCB to sodium sulfide was changed to 0.84. The weight average molecular weight of Prepolymer $P_3$ was 2100. The ratio of terminal thiolate groups to terminal halogen atoms was at least 20.

(Synthesis of PTKK prepolymer)

A titanium-lined 1-l reactor was charged with 0.0947 mole of 1,4-BCBB, 0.0104 mole of hydrated sodium sulfide (water content: 53.9 wt. %), 33 g of water and 379 g of NMP. After the reactor being purged with nitrogen gas, the contents were maintained at 220° C. for 1 hour for their reaction (water content/NMP=-about 5 mol/kg) to obtain a reaction slurry (KS$_3$) containing a PTKK prepolymer (K$_3$).

(Synthesis of block copolymer)

A block copolymer $B_5$ was synthesized, collected and dried under similar conditions to Example 2 except that the individual prepolymers were charged in a titanium-lined 1-l reactor to give a PATE block/PTKK block ratio of 60:40 (weight ratio).

(Physical properties of block copolymer)

Shown collectively in Table 1.

Example 6

(Production Process No. 2)

(Synthesis of PATE prepolymer)

A reaction slurry $S_4$ containing a prepolymer $P_4$ of poly(p-phenylene thioether) was obtained in a similar manner to the synthesis of the PATE prepolymer in Example 1 except that the charged molar ratio of PDCB to sodium sulfide was changed to 0.86. The weight average molecular weight of Prepolymer $P_4$ was 3,000, and the ratio of terminal thiolate groups to terminal halogen atoms was at least 20.

(Synthesis of PTKK prepolymer)

A titanium-lined 1-l reactor was charged with 0.0947 mole of 1,4-BCBB, 0.0220 mole of hydrated sodium sulfide (water content: 53.9 wt. %), 32 g of water and 379 g of NMP. After the reactor being purged with nitrogen gas, the contents were maintained at 220° C. for 1 hour for their reaction (water content/NMP=-about 5 mol/kg) to obtain a reaction slurry (KS$_4$) containing a PTKK prepolymer (K$_4$).

(Synthesis of block copolymer)

A block copolymer $B_6$ was synthesized, collected and dried under similar conditions to Example 2 except that the individual prepolymers were charged in a titanium-lined 1-l reactor to give a PATE block/PTKK block ratio of 60:40 (weight ratio).

(Physical properties of block copolymer)

Shown collectively in Table 1.

Comparative Example 1

(Synthesis of PTKK homopolymer)

A titanium-lined 1-l reactor was charged with 0.073 mole of 1,4-BCBB, 0.073 mole of hydrated sodium sulfide (water content: 53.9 wt. %), 500 g of NMP and 38.4 g of water. After the reactor being purged with nitrogen gas, the contents were maintained at 210° C. for 5 hours for their reaction (water content/NMP=5.0 mol/kg). The reactor was cooled, and the reaction mixture in the form of a slurry was taken out of the reactor. A portion of the slurry was passed through a screen having an opening size of 75 μm (200 mesh). However, no granular polymer was collected at all.

The remaining slurry was poured into acetone to have the resultant polymer precipitated. The polymer was collected by filtration, and then washed twice with acetone and additionally twice with water. Acetone and water were removed to obtain the polymer in a wet form. The wet polymer was dried at 100° C., thereby obtaining a fine particulate polymer ($R_1$) as an ivory powder.

The average particle size of Polymer $R_1$ was about 10 μm. Polymer $R_1$ thus obtained was soluble in 98% concentrated sulfuric acid but remained insoluble in α-chloronaphthalene even after maintained at 220° C. for 10 minutes.

Comparative Example 2

(Synthesis of PTKK homopolymer)

A polymer $R_2$ was obtained in a similar manner to Comparative Example 1 except that the contents of the reactor were maintained at 260° C. for 2 hours for their reaction.

The average particle size of polymer $R_2$ thus obtained was about 15 μm and polymer $R_2$ was soluble in 98% concentrated sulfuric acid but remained insoluble in α-chloronaphthalene even after maintained at 220° C. for 10 minutes.

Comparative Example 3

(Experimental granulation by co- and re-dissolution of homopolymers)

A titanium-lined 1-l reactor was charged with 10 g of fine particulate PTKK Polymer $R_1$ obtained in Comparative Example 1 and 15 g of poly(p-phenylene thioether) ("FORTRON #W214", trade name; product of Kureha Chemical Industry Co., Ltd.) and further with 500 g of NMP and 45 g of water. The contents were maintained at 260° C. for 2 hours. After cooling, the resultant slurry was passed through a screen having an opening size of 75 μm (200 mesh) to collect a particulate polymer. From the filtrate, a fine particulate polymer was also collected using a filter paper (class: 5A).

The polymers thus collected were separately washed and dried in a similar manner to Example 1, thereby obtaining 12 g of granular Polymer $R_3$ and 10 g of the fine particulate polymer.

Like poly(p-phenylene thioether), granular Polymer $R_3$ was insoluble in 98% concentrated sulfuric acid but soluble at 220° C. in α-chloronaphthalene. Its transition temperatures (melting point and glass transition point) were substantially the same as those of poly(p-phenylene thioether). Therefore no block copolymer was obtained.

Comparative Example 4

(Synthesis of random copolymer)

A titanium-lined 1-l reactor was charged with 0.1212 mole of 1,4-BCBB, 0.3576 mole of hydrated sodium sulfide (water content: 53.9 wt. %), 0.2365 mole of PDCB, 500 g of NMP and 54.2 g of water. They were reacted at 260° C. for 2 hours [water content/NMP=5 mol/kg, 1,4-BCBB/PDCB=55/45 (weight ratio)].

The reaction mixture in the form of a slurry, said mixture containing a random copolymer $R_4$, had a dark brown color and gave off an odor of decomposed polymers.

As a result of a gas chromatographic analysis, the remaining monomer was found to be PDCB. Its amount was equal to 22% of the amount charged. The slurry as the reaction mixture was caused to pass through a screen having an opening size of 75 μm (200 mesh). It was however unable to collect any granular polymer. From the filtrate, a fine particular polymer was also collected using a filter paper (class: 5A). It was washed and dried as in Comparative Example 1. The melting point of Random Copolymer $R_4$ thus obtained was 157° C., which was much lower than the melting points of the poly(p-phenylene thioether) and PTKK homopolymer.

Comparative Example 5

(Synthesis of random copolymer)

Polymerization was conducted in a similar manner to Comparative Example 4 except that 0.081 mole of 1,4-BCBB and 0.356 mole of PDCB were charged in lieu of 0.1212 mole of 1,4-BCBB and 0.2365 mole of PDCB [water content/NMP=5 mole/kg, 1,4-BCBB/PDCB=35/65 (weight ratio)].

The reaction mixture in the form of a slurry had a dark red color and gave off an offensive odor. The slurry was caused to pass through a screen having an opening size of 75 μm (200 mesh). It was however unable to collect any granular polymer.

As a result of a gas chromatographic analysis, the remaining monomer was found to be PDCB and to amount to 14% of the amount charged.

Comparative Example 6

(Synthesis of PATE prepolymer)

A reaction slurry $S_5$ containing a PATE prepolymer $P_5$ was obtained in a similar manner to the synthesis of the PATE prepolymer in Example 1 except that the charged molar ratio of PDCB to sodium sulfide was changed to 1.10.

(Synthesis of PTKK prepolymer)

A titanium-lined 1-l reactor was charged with 0.0814 mole of 1,4-BCBB, 0.126 mole of hydrated sodium sulfide (water content: 53.9 wt. %), 17.8 g of water and 325 g of NMP. After the reactor being purged with nitrogen gas, the contents were maintained at 220° C. for 1 hour for their reaction (water content/NMP=5 mol/kg) to obtain a reaction slurry ($KS_5$) containing a PTKK prepolymer ($K_5$).

(Attempted synthesis of block copolymer)

A polymer $R_6$ was synthesized, collected and dried as in Example 2 except that the individual prepolymers were charged in a titanium-lined 1-l reactor to give a PATE block/PTKK block ratio of 70:30 (weight ratio).

Judging from DSC, IR and composition analyses, Polymer $R_6$ was essentially poly(p-phenylene thioether).

Comparative Example 7

A titanium-lined 1-l reactor was charged with 388 g of Reaction Slurry $S_5$, which was prepared in Comparative Example 6 and contained PATE Prepolymer $P_5$, 0.0814 mole of 1,4-BCBB, 0.126 mole of hydrated sodium sulfide (water content: 53.9 wt. %), 58.1 g of water and 325 g of NMP. After the reactor being purged with nitrogen gas, the contents were reacted at 260° C. for 2 hour. A polymer $R_7$ was then collected and dried as in Example 2.

Judging from DSC, IR and composition analyses, Polymer $R_7$ was essentially poly(p-phenylene thioether).

Physical properties of the polymers thus obtained are collectively shown in Table 1.

TABLE 1

| | Polymer code | PATE recurring units/ PTKK recurring units Charged value (weight ratio) | PATE recurring units/ PTKK recurring units Analyzed value (weight ratio) | Transition temp. $Tg^{1)}$ (°C.) | Transition temp. $Tm^{2)}$ (°C.) | Crystallinity · melt stability [400° C.] Tmc (°C.) | Crystallinity · melt stability [400° C.] ΔHmc (J/g) | Crystallinity · melt stability [400° C./ 10 min] Tmc (°C.) | Crystallinity · melt stability [400° C./ 10 min] ΔHmc (J/g) | Melt viscosity 380° C., 1200 sec$^{-1}$ (poise) | Collection rate of polymer (%) Screen opening 150 μm | Collection rate of polymer (%) Screen opening 75 μm | Collectability | Remarks |
|---|---|---|---|---|---|---|---|---|---|---|---|---|---|---|
| Ex.1 | $B_1$ | 2.3(70/30) | 71/29 | 100 | 300/345 | 255 | 45 | 215 | 36 | 60 | 78 | 83 | Excellent | Production process No.1 |
| Ex.2 | $B_2$ | 2.3(70/30) | 69/31 | 100 | 298/345 | 260 | 50 | 224 | 39 | 390 | 65 | 70 | Excellent | Production process No.2 |
| Ex.3 | $B_3$ | 1.5(60/40) | 62/38 | 99 | 285/301 | 190 | 27 | 193 | 20 | 350 | 62 | — | Excellent | Production process No.2 (1,3-BCBB) |
| Ex.4 | $B_4$ | 0.7(40/60) | 41/59 | 120 325 | 382/— | 319 | 33 | 220 | 22 | 4300 | — | 6 | Poor process | Production No.2 (1,4-BCBB) |
| Ex.5 | $B_5$ | 1.5(60/40) | 60/40 | 106 302 | 353/266 | 310/44 | 44 | 257 | 37 | 50 | — | 53 | Good process | Production No.2 (1,4-BCBB) |
| Ex.6 | $B_6$ | 1.5(60/40) | 59/41 | 105 | 356/300 | 302/315 | 45 | 245 | 37 | 50 | 53 | 64 | Excellent | Production process No.2 (1,4-BCBB) |
| Comp. Ex.1 | $R_1$ | 0 (0/100) PTKK hompolymer | | 148 | 412 | — | — | — | — | — | 0 | 0 | Poor | Fine powder |
| Comp. Ex.2 | $R_2$ | 0 (0/100) PTKK homopolymer | | — | 408 | — | — | — | — | — | 0 | 0 | Poor | Fine powder |
| Comp. Ex.3 | $R_3$ | 1.5(60/40) Blend | | 86 | 293 | — | — | — | — | — | 48 | — | — | PATE alone collected as granules |
| Comp. Ex.4 | $R_4$ | 0.7(40/60) Trial random copolymer | | — | 157 | — | — | — | — | — | 0 | 0 | Poor | Offensive odor. Poor copolymerizability |
| Comp. Ex.5 | $R_5$ | 1.5(60/40) Trial random coplymer | | — | — | — | — | — | — | — | 0 | 0 | Poor | Offensive odor. Poor copolymerizability |
| Comp. Ex.6 | $R_6$ | 2.3(70/30) Trial block copolymer | | 86 | 294 | 220 | 41 | 205 | 31 | — | 48 | — | — | PATE alone collected as granules |
| Comp. Ex.7 | $R_7$ | 2.3(70/30) Trial block copolymer | | 86 | 290 | 219 | 43 | 205 | 33 | — | 47 | — | — | PATE alone collected as granules |
| Ref. Ex. | 3) | (100/0) PATE homopolymer | | 85 | 293 | 238 | 30 | 218 | 25 | 360 | — | — | — | |

[1)] Glass transition temperature, Tg as determined by DSC at a heating rate of 10° C./min by using a quench-pressed sheet (pressed at 380–430° C.) as a sample.
[2)] Melting point, Tm of as-polymerized polymer as determined by DSC at a heating rate of 10° C./min. In those having plural melting points, the left values are main peak temperatures.
[3)] "FORTRON #W214", poly(p-phenylene thioether) produced by Kureha Chemical Industry Co., Ltd.

Example 7
(Solubility of block copolymers in solvent)

Block Copolymer $B_1$, Block Copolymer $B_2$, PTKK Homopolymer $R_1$ synthesized in Comparative Example 1 and poly(p-phenylene thioether) ("FORTRON #W214", trade name; product of Kureha Chemical Industry Co., Ltd.) were separately hot-pressed and then cooled to form amorphous sheets. The respective amorphous sheets were placed in the solvents shown in Table 2 to investigate their dissolution behaviors.

As given in Table 2, the block copolymers have properties different from PTKK homopolymer and poly(p-phenylene thioether), which are homopolymers of the components of the block copolymers. Namely, the block copolymers were insoluble in 98% concentrated sulfuric acid, which is a solvent for PTKK homopolymer, and also insoluble in α-chloronaphthalene which is a solvent for PATE homopolymer. Further, the dissolution behaviors of the block copolymers in the mixed solvent of p-chlorophenol/1,2,4-trichlorobenzene are clearly different from those of PTKK homopolymer and PATE homopolymer.

TABLE 2

| Solvent Dissolution temperature | 98 wt. % conc. sulfuric acid Room[1)] temperature | α-chloranaphthalene Room temperature | α-chloranaphthalene 220° C. | p-Chlorophenol/1,2,4-trichlorobenzene mixed solvent (50/50 weight ratio) Room temperature | p-Chlorophenol/1,2,4-trichlorobenzene mixed solvent (50/50 weight ratio) 215° C. | p-Chlorophenol/1,2,4-trichlorobenzene mixed solvent (50/50 weight ratio) 215° C. → room temp.[2)] | p-Chlorophenol/1,2,4-trichlorobenzene mixed solvent (50/50 weight ratio) 215° C. → 150° C.[3)] |
|---|---|---|---|---|---|---|---|
| Polymer Block copolymer, $B_1$ | B | B | B | B | A | Precipitated | A |
| Block copolymer, $B_2$ | B | B | B | B | A | Precipitated | A |
| PTKK homopolymer | A | B | B | B | B | — | — |

TABLE 2-continued

| Solvent Dissolution temperature | 98 wt. % conc. sulfuric acid Room[1] temperature | α-chloranaphthalene | | p-Chlorophenol/1,2,4-trichlorobenzene mixed solvent (50/50 weight ratio) | | | |
|---|---|---|---|---|---|---|---|
| | | Room temperature | 220° C. | Room temperature | 215° C. | 215° C.→ room temp.[2] | 215° C.→ 150° C.[3] |
| PATE homopolymer | B | B | A | B | A | Precipitated | Precipitated |

A: Soluble (to complete clearness to the vision).
B: Insoluble.
[1] Subjected to a solubilizing operation at room temperature for 30 minutes.
[2] A state when maintained at room temperature for 2 hours after a solubilizing operation was conducted at 215° C. for 30 minutes.
[3] A state when maintained at 150° C. for 30 minutes after a solubilizing operation was conducted at 215° C. for 30 minutes.

Example 8

(Moisture absorption resistance)

Block Copolymer $B_1$ synthesized in Example 1, PTKK Homopolymer $R_1$ synthesized in Comparative Example 1 and poly(p-phenylene thioether) ("FORTRON #W214", trade name; product of Kureha Chemical Industry Co., Ltd.) were separately dried in a powder form at 120° C. for 3 hours. Thereafter, they were left over for 800 hours in an atmosphere the moisture level of which were controlled at 97% RH with a saturated aqueous solution of $K_2SO_4$.

The weight change of each sample before and after the moisture absorption was measured. Poly(p-phenylene thioether) underwent a weight change of 0.07%. On the other hand, PTKK homopolymer $R_1$ showed a weight change of 6.2% while the weight change of Block Copolymer $B_1$ was as small as 0.2% and hence demonstrated far superior moisture absorption resistance.

Example 9

(Production Process No. 1)

(Synthesis of PATE prepolymer)

A reaction slurry $S_9$ containing a prepolymer $P_9$ of poly(p-phenylene thioether) was obtained in a similar manner to the synthesis of the PATE prepolymer in Example 1 except that PDCB was charged to give a charged PDCB/sodium sulfide molar ratio of 0.85 and polymerization was conducted for 4 hours at 220° C. and for additional 4 hours at 230° C.

The weight average molecular weight of Prepolymer $P_9$ was 2,420 and remaining PDCB was less than 0.1% of the amount charged. Further, the ratio of terminal thiolate groups to terminal halogen atoms was over 20.

(Synthesis of block copolymer)

A charge pot equipped with a heater was mounted on the titanium-lined 20-l reactor which contained 9.20 kg of Slurry $S_9$. The pot was charged with 3.53 kg of NMP, 0.626 kg of 1,4-BCBB and 0.508 kg of water, and was then purged with nitrogen.

After the content of the reactor and those of the charge pot were separately heated to 180° C., the contents of the charge pot were added to Reaction Slurry $S_9$ in the reactor, followed by the addition of 0.567 kg of water.

The resulting mixture was reacted at 265° C. for 0.5 hour. After it was allowed to cool down to 240° C., it was subjected to final treatment. The final treatment of the reaction was conducted by adding under pressure a liquid mixture, which consisted of 124 g of 4,4'-dichlorobenzophenone (hereinafter abbreviated as "DCBP") and 0.72 kg of NMP, and then reacting DCBP at 240° C. for 0.5 hour.

The reaction conditions employed upon synthesis of the block copolymer were as follows:

(1) The molar ratio of the total amount of the charged dihalogenated aromatic compounds [the sum of the amount of PDCB charged upon synthesis of Prepolymer $P_9$ and the amount of 1,4-BCBB charged upon synthesis of the block copolymer] to the total amount of the charged alkali metal sulfide [the amount of the sodium sulfide charged upon synthesis of Prepolymer $P_9$] was 0.99.

(2) The molar ratio of the charged amount of PDCB to that of 1,4-BCBB was 6.1.

(3) The ratio of the water content to the charged amount of NMP was 8 mol/kg.

(Collection of block copolymer)

Collection was conducted in a similar manner to Example 1, thereby obtaining a block copolymer ($B_9$). The collection rate was 74% when collected by a screen having an opening size of 150 μm.

(Physical properties of block copolymer)

Physical properties of Block Copolymer $B_9$ were as follows:

Melt viscosity: 650 poises.
Transition temperatures: Tg: 109° C. (quenched press sheet). Tm: 313° C. and 335° C. (polymer as polymerized).
Melt crystallization temperature: Tmc (400° C.): 258° C. Tmc (400° C./10 min): 258° C.
Melt crystallization enthalpy: ΔHmc (400° C.): 48 J/g.
Residual melt crystallization enthalpy: ΔHmc (400° C./10 min): 47 J/g.

Incidentally, the weight ratio of the sum of PATE recurring units to the sum of PTKK recurring units was 2.1 (67.6/32.4).

Example 10

(Production Process No. 1)

(Synthesis of PATE prepolymer)

A reaction slurry $S_{10}$ containing a prepolymer $P_{10}$ of poly(p-phenylene thioether) was obtained in a similar manner to the synthesis of the PATE prepolymer in Example 1 except that PDCB was charged to give a charged PDCB/sodium sulfide molar ratio of 0.70 and polymerization was conducted for 6 hours at 220° C.

The weight average molecular weight of Prepolymer $P_{10}$ was 1,250. Further, the ratio of terminal thiolate groups to terminal halogen atoms was over 20.

(Synthesis of block copolymer)

A titanium-lined 1-l reactor was charged with 266 g of Reaction Slurry $S_{10}$, 39.9 g of 1,4-BCBB, 450 g of NMP and 81.78 g of water. After the reactor being purged with nitrogen gas, the contents were heated and reacted at 265° C. for 1 hour.

The reaction conditions employed upon synthesis of the block copolymer were as follows:

(1) The molar ratio of the total amount of the charged dihalogenated aromatic compounds to the total amount of the charged alkali metal sulfide was 1.00.

(2) The molar ratio of the charged amount of PDCB to that of 1,4-BCBB was 2.3.

(3) The ratio of the water content to the charged amount of NMP was 8 mol/kg.

(Collection of block copolymer)

From the reaction slurry thus obtained, the polymer was collected using a filter paper (class: 5A). The polymer was thoroughly washed with acetone and water and then dried, whereby a block copolymer $B_{10}$ was obtained (correction rate: 82%).

(Physical properties of block copolymer)

Physical properties of Block Copolymer $B_{10}$ were as follows:
Melt viscosity: 50 poises.
Transition temperatures: Tg: 107° C. (quenched press sheet). Tm: 364° C. (polymer as polymerized).
Melt crystallization temperature: Tmc (400° C.): 301° C. Tmc (400° C./10 min): 232° C.
Melt crystallization enthalpy: ΔHmc (400° C.): 61 J/g.
Residual melt crystallization enthalpy: ΔHmc (400° C./10 min): 24 J/g.

Incidentally, the weight ratio of the sum of PATE recurring units to the sum of PTKK recurring units was 0.79(44/56).

Example 11

(Production Process No. 1)

(Synthesis of PATE prepolymer)

A reaction slurry $S_{11}$ containing a prepolymer $P_{11}$ of poly(p-phenylene thioether) was obtained in a similar manner to the synthesis of the PATE prepolymer in Example 1 except that PDCB was charged to give a charged PDCB/sodium sulfide molar ratio of 0.83 and polymerization was conducted at 220° C. for 4 hours.

The weight average molecular weight of Prepolymer $P_{11}$ was 1,560 and remaining PDCB was below 0.1% of the amount charged. Further, the ratio of terminal thiolate groups to terminal halogen atoms was over 20.

(Synthesis of block copolymer)

A titanium-lined 1-l reactor was charged with 416 g of Reaction Slurry $S_{11}$, 32.5 g of 1,3-BCBB, 183 g of NMP and 52.1 g of water. After the reactor being purged with nitrogen gas, the contents were heated and reacted at 245° C. for 0.5 hour.

After the reaction mixture thus obtained was allowed to cool down to 240° C., final treatment was applied by charging under pressure a liquid mixture, which consisted of 5.7 g of DCBP and 46 g of NMP, and then reacting DCBP at 230° C. for 0.5 hour.

The reaction conditions employed upon synthesis of the block copolymer were as follows:

(1) The molar ratio of the total amount of the charged dihalogenated aromatic compounds to the total amount of the charged alkali metal sulfide was 0.99.

(2) The molar ratio of the charged amount of PDCB to that of 1,3-BCBB was 5.2.

(3) The ratio of the water content to the charged amount of NMP was 8 mol/kg.

(Collection of block copolymer)

Collection was carried out in a similar manner to Example 1, whereby a block copolymer $B_{11}$ was obtained. When collected by a screen having an opening size of 50 μm, the collection rate was 71%.

(Physical properties of block copolymer)

Physical properties of Block Copolymer $B_{11}$ were as follows:
Melt viscosity: 40 poises.
Transition temperatures: Tg: 104° C. (quenched press sheet). Tm: 295° C. and 230° C. (polymer as polymerized).
Melt crystallization temperature: Tmc (400° C.): 190° C. Tmc (400° C./10 min): 180° C.
Melt crystallization enthalpy: ΔHmc (400° C.): 25 J/g.
Residual melt crystallization enthalpy: ΔHmc (400° C./10 min): 20 J/g.

Incidentally, the weight ratio of the sum of PATE recurring units to the sum of PTKK recurring units was 1.6.

Example 12

(Production Process No. 1)

(Synthesis of PATE prepolymer)

A titanium-lined reactor was charged with 64.1 g of hydrated sodium sulfide (water content: 39.13 wt. %), 64.7 g of PDCB, 1.5 g of sodium hydroxide, 25.1 g of water and 500 g of NMP. After the reactor being purged with nitrogen gas, the contents were heated and reacted at 250° C. for 3 hours (PDCB/sodium sulfide=0.88 mol/mol, water content/NMP=5.6 mol/kg) so that a reaction slurry $S_{12}$ containing a poly(p-phenylene thioether) prepolymer $P_{12}$ was obtained.

The weight average molecular weight of Prepolymer $P_{12}$ was 3,800. Further, the ratio of terminal thiolates to terminal halogen atoms was over 20.

(Synthesis of block copolymer)

A titanium-lined reactor was charged with 500 g of Reaction Slurry $S_{12}$ and 14.56 g of 1,4-BCBB. After the reactor being purged with nitrogen gas, the contents were heated and reacted at 265° C. for 0.5 hour (water content/NMP=5.6 mol/kg).

After the reaction mixture thus obtained was allowed to cool down to 240° C., final treatment was applied by charging under pressure a liquid mixture, which consisted of 4.8 g of DCBP, 40 g of NMP and 4 g of water, and then reacting DCBP at 240° C. for 0.5 hour.

The reaction conditions employed upon synthesis of the block copolymer were as follows:

(1) The molar ratio of the total amount of the charged dihalogenated aromatic compounds (the sum of the amount of PDCB charged upon synthesis of Prepolymer $P_{12}$ and the amount of 1,4-BCBB charged upon synthesis of the block copolymer] to the total amount of the charged alkali metal sulfide (the amount of sodium sulfide charged upon synthesis of Prepolymer $P_{12}$) was 0.99.

(2) The molar ratio of the charged amount of PDCB to the charged amount of 1,4-BCBB was about 8.2.

(3) The ratio of the water content to the charged amount of NMP was about 5.6 mol/kg.

(Collection of block copolymer)

Collection was carried out in a similar manner to Example 1, whereby a block copolymer $B_{12}$ was obtained. When collected by a screen having an opening size of 150 μm, the collection rate was 65%.

(Physical properties of block copolymer)

Physical properties of Block Copolymer $B_{12}$ were as follows:
Melt viscosity: 30 poises.
Transition temperatures: Tg: 95° C. (quenched press sheet). Tm: 301° C. (polymer as polymerized).
Melt crystallization temperature: Tmc (400° C.): 268° C. Tmc (400° C./10 min): 245° C.
Melt crystallization enthalpy: ΔHmc (400° C.): 58 J/g.
Residual melt crystallization enthalpy: ΔHmc (400° C./10 min): 49 J/g.

Incidentally, the weight ratio of the sum of PATE recurring units to the sum of PTKK recurring units was 2.7.

Example 13

(Production Process No. 2)

(Synthesis of PATE prepolymer)

A titanium-lined reactor was charged with 128.2 g of hydrated sodium sulfide (water content: 39.13 wt. %), 132.3 g of PDCB, 3 g of sodium hydroxide and 500 g of NMP. After the reactor being purged with nitrogen gas, the contents were heated and reacted at 250° C. for 3 hours (PDCB/sodium sulfide=0.90 mol/mol, water content/NMP=5.6 mol/kg) so that a reaction slurry $S_{13}$ containing a poly(p-phenylene thioether) prepolymer $P_{13}$ was obtained.

The weight average molecular weight of Prepolymer $P_{13}$ was 4,300. Further, the ratio of terminal thiolates to terminal halogen atoms was 15.

(Synthesis of PTKK prepolymer)

A titanium-lined reactor was charged with 63.6 g of 1,4-BCBB, 9.7 g of hydrated sodium sulfide (water content: 53.88 wt. %), 67 g of water and 716 g of NMP. After the reactor being purged with nitrogen gas, the contents were maintained at 220° C. for 1 hour for their reaction (water content/NMP=5.6 mol/kg) to obtain a reaction slurry ($KS_{13}$) containing a PTKK prepolymer ($K_{13}$).

(Synthesis of block copolymer)

A titanium-lined reactor was charged with 469.7 g of Reaction Slurry $S_{13}$ and 389.1 g of Reaction Slurry $KS_{13}$. After the reactor being purged with nitrogen gas, the contents were heated and reacted at 265° C. for 0.5 hour.

After the reaction mixture thus obtained was allowed to cool down to 240° C., final treatment was applied by charging under pressure a liquid mixture, which consisted of 6.5 g of DCBP and 51.7 g of NMP, and then reacting DCBP at 240° C. for 0.5 hour.

The reaction conditions employed upon synthesis of the block copolymer were as follows:

(1) The molar ratio of the total amount of the charged dihalogenated aromatic compounds to the total amount of the charged alkali metal sulfide was 0.99.

(2) The weight ratio of PATE blocks to PTKK blocks was 70:30.

(3) The ratio of the water content to the charged amount of NMP was 5.6 mol/kg.

(Collection of block copolymer)

Collection was carried out in a similar manner to Example 1, whereby a block copolymer $B_{13}$ was obtained. When collected by a screen having an opening size of 150 μm, the collection rate was 63%.

(Physical properties of block copolymer)

Physical properties of Block Copolymer $B_{13}$ were as follows:
Melt viscosity: 30 poises.
Transition temperatures: Tg: 99° C. (quenched press sheet). Tm: 303° C. and 320° C. (polymer as polymerized).
Melt crystallization temperature: Tmc (400° C.): 241° C. Tmc (400° C./10 min): 240° C.
Melt crystallization enthalpy: ΔHmc (400° C.): 65 J/g.
Residual melt crystallization enthalpy: ΔHmc (400° C./10 min): 65 J/g.

Incidentally, the weight ratio of the sum of PATE recurring units to the sum of PTKK recurring units was 2.3.

We claim:

1. A process for the production of a high-heat-resistant, crystalline block copolymer comprising (A) at least one poly(arylene thioetherketoneketone) block and (B) at least one poly(arylene thioether) block, which comprises at least the following two steps:

i) heating in the presence of water an organic amide solvent containing a dihalogenated aromatic compound, which consists principally of a dihalobenzene, and an alkali metal sulfide, whereby a reaction mixture containing a poly(arylene thioether) prepolymer having at least 50 wt. % recurring units of the formula

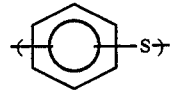

and reactive terminal groups is formed, and ii) mixing the reaction mixture, which has been obtained in the step i), with a dihalogenated aromatic compound consisting principally of a bis(halobenzoyl)benzene and, if necessary, an alkali metal sulfide, an organic amide solvent or water and heating the resultant mixture to form a poly(arylene thioetherketoneketone) block having at least 50 wt. % recurring units of the formula

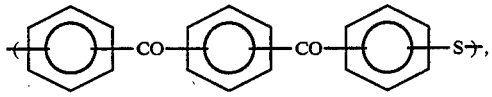

thereby obtaining the block copolymer, said first and second steps i) and ii) being conducted under the following conditions (a)–(f):

(a) in the first step i), the ratio of the water content to the amount of the charged organic amide solvent being 0.1–15 (mol/kg), the ratio of the amount of the charged dihalogenated aromatic compound to the amount of the charged alkali metal sulfide being 0.7–1.05 (mol/mol), and the polymerization being conducted until the weight average molecular weight of the poly(arylene thioether) prepolymer becomes at least 1,000, (b) in the second step, the ratio of the water content to the amount of the charged organic amide solvent being controlled within a range of 0.1–15 (mol/kg), (c) in the second step, the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that charged in the second step ii) as needed, being controlled within a range of 0.95–1.2 (mol/mol), (d) the ratio of the charged amount of the dihalogenated aromatic compound consisting principally of the dihalobenzene to the charged amount of the dihalogenated aromatic compound consisting principally of the bis(halobenzoyl)benzene being controlled within a range of 0.25–26 (mol/mol), (e) the reaction of the second step ii) being conducted within a temperature range of 150°–300° C. with the proviso that the reaction time at 210° C. and higher is not longer than 10 hours, and (f) in the second step ii), the reaction is conducted until the melt viscosity of the resulting block copolymer becomes 2–100,000 poises as measured at 380° C. and a shear rate of 1,200/sec.

2. The process as claimed in claim 1, wherein the poly(arylene thioetherketoneketone) block (A) has at least 50 wt. % recurring units of the formula

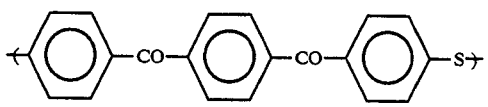

and the poly(arylene thioether) block (B) has at least 50 wt. % recurring units of the formula

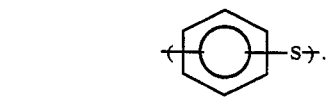

3. The process as claimed in claim 1, wherein the poly(arylene thioetherketoneketone) block (A) has at least 50 wt. % recurring units of the formula

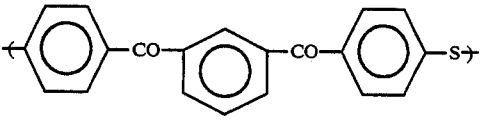

and the poly(arylene thioether) block (B) has at least 50 wt. % recurring units of

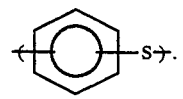

4. The process as claimed in claim 1, wherein a reactor at least a portion of which, said portion being brought into contact with the reaction mixtures, is made of a corrosion-resistant material is used.

5. The process as claimed in claim 4, wherein the corrosion-resistant material is a titanium material.

6. The process as claimed in claim 1, wherein the organic amide solvent is at least one pyrrolidone selected from N-methylpyrrolidone and N-ethylpyrrolidone.

7. The process as claimed in claim 1, wherein upon obtaining the block copolymer, at least 50 wt. % of the resulting block copolymer is in the form of granules recoverable on a sieve having an opening size of 75 μm.

* * * * *